United States Patent
Sankey et al.

(10) Patent No.: US 7,894,344 B2
(45) Date of Patent: Feb. 22, 2011

(54) SYSTEM AND METHOD FOR AGGREGATED SHAPING OF MULTIPLE PRIORITIZED CLASSES OF SERVICE FLOWS

(75) Inventors: Wayne Robert Sankey, Plano, TX (US); Ross Alexander Jamieson, Plano, TX (US); Paul Anthony Elias, Richardson, TX (US); John Kevin Weeks, Richardson, TX (US)

(73) Assignee: ADVA AG Optical Networking, Martinaried (DE)

( * ) Notice: Subject to any disclaimer, the term of this patent is extended or adjusted under 35 U.S.C. 154(b) by 230 days.

(21) Appl. No.: 11/681,606

(22) Filed: Mar. 2, 2007

(65) Prior Publication Data

US 2008/0212473 A1 Sep. 4, 2008

(51) Int. Cl.
*G06F 11/00* (2006.01)
(52) U.S. Cl. .................. 370/235; 370/412; 370/419
(58) Field of Classification Search .................. 370/235, 370/412, 395, 229, 231
See application file for complete search history.

(56) References Cited

U.S. PATENT DOCUMENTS

| | | | |
|---|---|---|---|
| 6,011,798 A * | 1/2000 | McAlpine | 370/395.42 |
| 6,560,230 B1 * | 5/2003 | Li et al. | 370/395.42 |
| 6,771,653 B1 * | 8/2004 | Le Pennec et al. | 370/412 |
| 6,901,050 B1 * | 5/2005 | Acharya | 370/230.1 |
| 6,925,055 B1 * | 8/2005 | Erimli et al. | 370/229 |
| 6,944,172 B2 * | 9/2005 | Sankey et al. | 370/412 |
| 7,002,980 B1 * | 2/2006 | Brewer et al. | 370/414 |
| 7,006,440 B2 * | 2/2006 | Agrawal et al. | 370/235 |
| 2003/0086431 A1 * | 5/2003 | Wu et al. | 370/395.42 |
| 2003/0198241 A1 * | 10/2003 | Putcha et al. | 370/419 |
| 2005/0216822 A1 * | 9/2005 | Kyusojin et al. | 715/501.1 |
| 2006/0187949 A1 * | 8/2006 | Seshan et al. | 370/412 |

* cited by examiner

*Primary Examiner*—Ricky Ngo
*Assistant Examiner*—Rasheed Gidado
(74) *Attorney, Agent, or Firm*—Hayes and Boone, LLP

(57) ABSTRACT

A system coupled between at least one input port and at least one output port comprises at least one queue, each queue being identified by a QID and operable to receive and buffer data in at least one service flow from the at least one input port. The system further comprises a predetermined at least one token allocated to each queue, each token indicative whether a predetermined amount of data may be dequeued from a queue and transmitted to the output port. The system comprises at least one group of queues where each queue in the group has a subordinate QID identifying a subordinate queue in the group having a lower priority for reallocating unused tokens. The at least one output port receives at least one output flow comprising the dequeued data from the at least one queue.

31 Claims, 3 Drawing Sheets

SYSTEM AND METHOD FOR AGGREGATED SHAPING OF MULTIPLE PRIORITIZED CLASSES OF SERVICE FLOWS

BACKGROUND

In various communication applications, it is often desirable to prioritize data and voice traffic competing for limited bandwidth in a network connection. In particular, in a an access gateway connecting a number of customer equipment on one or more local area networks (LANs) to a carrier network, the communication traffic in competition for access to the carrier network may include VoIP, video, and data traffic. These different types of traffic generally have different requirements in terms of bandwidth, jitter, latency, and frame loss. For example, VoIP traffic have low bandwidth requirements and demands low latency, jitter, and frame loss because the caller and callee are carrying on a real-time conversation. On the other hand, video data traffic requires higher bandwidth and can tolerate higher jitter, latency, and frame loss. Typically, the access gateway connecting the customer equipment on LANs or VLANs to a carrier network utilizes a work-conserving scheduler to prioritize traffic onto the up-link, or alternatively provides only a single bandwidth controlled service.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
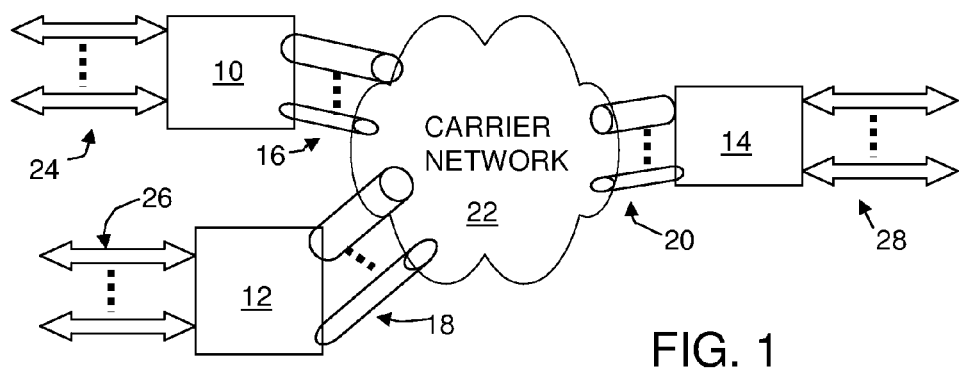
FIG. 1 is a simplified block diagram of a plurality of access gateways connecting local area networks each having one or more Ethernet virtual circuits of various bandwidths transmitting and receiving data frames over a carrier network.

FIG. 1 is a simplified block diagram of a plurality of access gateways 10-14 coupled to local area networks (LANs) or virtual LANs (VLANs) and to Ethernet virtual circuits (EVCs) 16-20 of various bandwidths over a carrier network 22, such as a wide area network (WAN). Access gateways 10-14 are operable to provide aggregated shaping of multiple prioritized class of service (CoS) flows 24-28. Preferably, the access gateways support the IEEE 802.1ad, 802.1ag, 802.1D, 802.1Q, 802.3ah, and other applicable standards. Although the description herein specifies LANs, VLANs, and WANs, the system and method described herein other types of computer networks and virtual connections.

Figure 2:
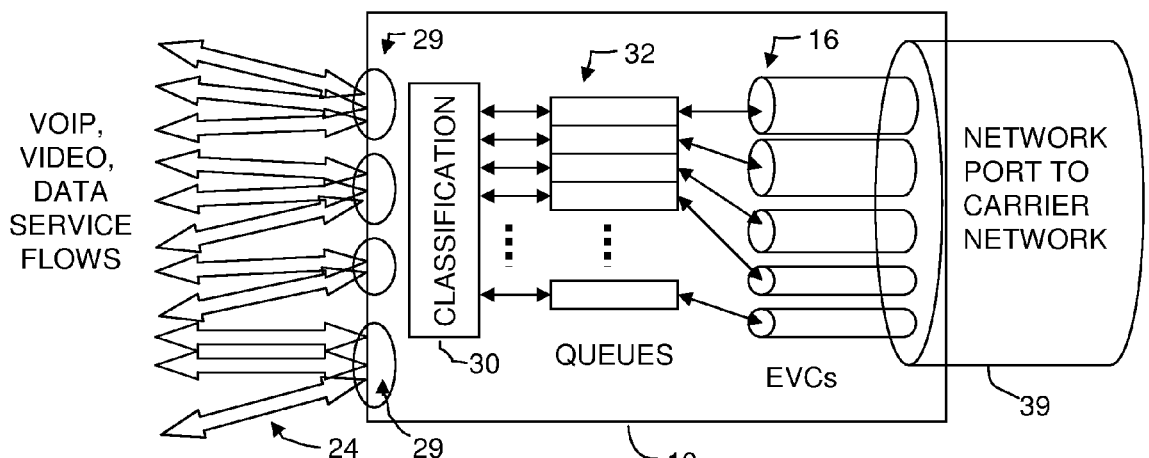
FIG. 2 is a simplified block diagram of an embodiment of an access gateway operable to provide aggregated shaping of multiple prioritized classes of service flows.

FIG. 2 is a simplified block diagram of an embodiment of an access gateway 10. Access gateway 10 is coupled to one or more customer ports 29 to receive and transmit one or more service flows 24. The traffic in the service flows may include VoIP, video, and data traffic that have different bandwidth, latency and jitter requirements. A customer Ethernet virtual circuit (EVC) connection is identified by a unique X-tag at a customer port 29. The data frames in the service flows 24 arriving on the customer ports 29 are sorted and classified by a classification module 30 and forwarded in CoS flows to other processing modules, including one or more queues 32 that perform buffering and shaping. The queues are further grouped and prioritized to form groups of queues which enable aggregated scheduling of the grouped queues subject to one another. As a result, groups of queues 32 related by network port EVC or output LAN port are scheduled subject to each other. The groups have strict priority for determining frame egress ordering subject to the availability of tokens. Details of the aggregated scheduling are set forth below. Data frames are removed from the queues 32 (dequeued) and transmitted over one or more Ethernet virtual circuits 16 out to the carrier network 22 via at least one network port 39 according to certain parameters of the service flows, such as committed information rate (CIR) and excess information rate (EIR), and the CoS for the queue. This aspect is described in more detail below. The Ethernet virtual circuits at the network port 39 are identified by a unique S and C tag combination. Any queue may be mapped to any output port and the frames from any input port may be entered into any queue.

Figure 3:
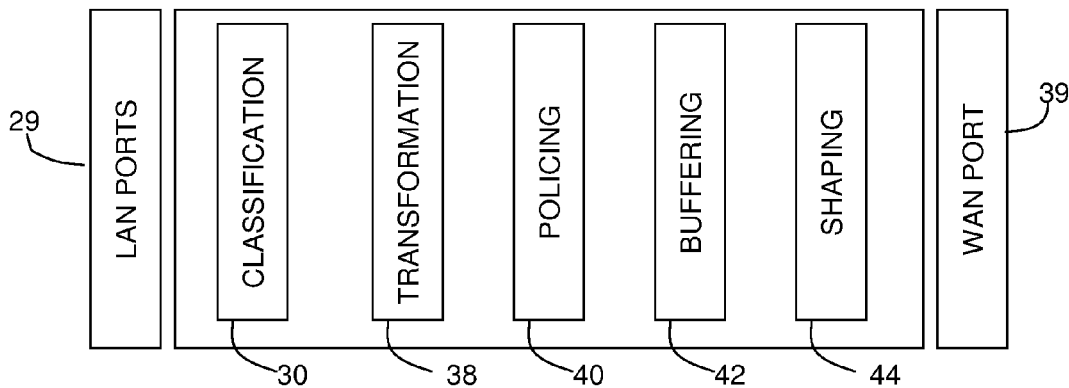
FIG. 3 is a simplified block diagram of an embodiment of certain modules of an access gateway operable to provide aggregated shaping of multiple prioritized classes of service flows.

FIG. 3 is a simplified block diagram of an embodiment of certain modules of an access gateway 10 operable to provide aggregated shaping of multiple prioritized classes of service flows. Access gateway 10 is coupled to one or more local area network ports 29 on one side and to one or more network ports 39 leading to a carrier network 22 that may be a wide area network (WAN), for example. The carrier network 22 may comprise other types of networks and network equipment to transmit communications traffic. Access gateway 10 includes the classification module 30 that performs priority classification on incoming data frames and forwards the data frames in CoS flows. The classification module 30 may perform the classification depending on one or more properties of the frame, including for example, VID (VLAN Identifier) and/or PRI (Priority) fields of the VLAN tag(s) and/or the IP layer TOS/DSCP fields of the frame. A customer port 29 may be configured as a TLS (transparent LAN services) or TVLS (transparent VLAN services) type. According to the type of port, the data frames may be accepted or discarded in response to the VLAN tag and VID values, or other parameters. When a customer port 29 is operating in a VLAN-aware mode, frames belonging to the service flows which have the proper VLAN tags are passed downstream. Data frames in service flows received from customer ports 29 operating in a VLAN-unaware or transparent mode, the service flows must be classified and the proper tags "pushed" or inserted into the data frames. The access gateway 10 is operable to support classification of services based on layer 2 protocol information, i.e., the media access control (MAC) header and the VLAN tags, and layer 3 information, i.e., the type of service (TOS) and differentiated services code point (DSCP) fields. The data traffic are thus identified by CoS classes.

A transformation module 38 is operable to perform certain VLAN tag operations on incoming data frames. The transformation module 38 "pushes" or inserts the proper C VLAN tags into the data frames and may make other transformations. The X tag identifies a CoS flow belonging to the customer port and is mapped to a C tag on the network port. A policing module 40 is operable to check the conformance of the data frames to declared traffic characterization parameters. The policing module 40 meters the incoming flow and determines whether to pass the frame if the frame is within the service profile, marking it as "drop eligible" and passing the flow if it is outside the committed service parameters but within the excess service parameters, or dropping the frame immediately if it is outside the excess service parameters. The policing module 40 may test incoming traffic against a number of bandwidth profile parameters, such as the committed information rate (CIR), the committed burst size (CBS), the excess information rate (EIR), and/or the excess burst size (EBS). A single VLAN can have multiple policing flows to police the rate of different member PRI codepoints as separate CoS classes.

A buffering module 42 comprises one or more queues that buffer data frames in the CoS flows until the frames are de-queued according to the scheduling algorithms of a shaping module 44. One or more CoS flows from the policing module can flow into a queue. Queues related by network port EVC or output LAN port are grouped in such a way as to determine a service. As a result, groups of queues 32 related by network port EVC or output LAN port are scheduled subject to each other. The groups have strict priority for determining frame egress ordering subject to the provisioned bandwidth and shaping parameters. The shaping module 44 uses a token bucket method to remove the data from the queues in response to the CIR, CBS, EIR, EBS, CoS, the availability of bandwidth, and other provisioning parameters. Details of the operations of the buffering module and the shaping module are set forth below.

Figure 4:
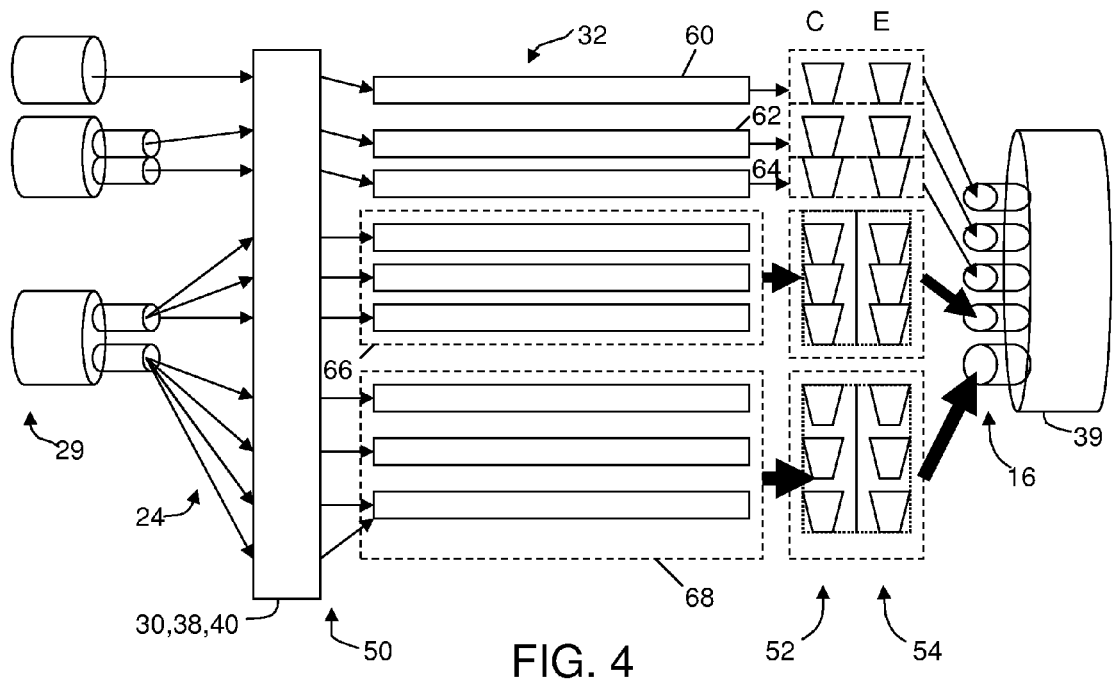
FIG. 4 is a more detailed block diagram of an embodiment of upstream (ingress) aggregated shaping of one or more prioritized class of service flows.

FIG. 4 is a more detailed block diagram of an embodiment of upstream (ingress) aggregated shaping of multiple prioritized class of service flows. One or more service flows 24 are received from one or more customer ports 29 coupled to LANs or VLANs. The service flow data frames may be identified by the port they are received from and the X VLAN tag. The service flows are first processed by the classification module 30, transformation module 38, and policing module 40, collectively show as one block in FIG. 4. The VLAN data frames in the service flows 50 existing in these modules comprise X, C, and S VLAN tags. A double-tagged network virtual circuit connection is identified by a unique S and C tag combination at the determined network port. A singly-tagged network virtual circuit connection is identified by either a unique S or C tag. Each policed CoS flows 50 is typically provided to a queue 32, however, multiple CoS flows may be linked to the same queue. Each queue is identified by a queue identifier (QID) and assigned a CIR token bucket 52 and an EIR token bucket 54. Each queue is allocated a fixed number of bytes from a shared buffer memory pool. The queues do not compete with one another for memory once the allocation has been completed. The queues may be of different sizes based on a provisioned value Each queue is provisioned to have a certain number of tokens for the CIR token bucket 52 that correlates to a maximum guaranteed traffic rate. The number of tokens in the EIR bucket 54 correlates to the excess traffic rate. The maximum number of tokens allocated to the CIR bucket 52 is a function of the CBS and the maximum number of tokens allocated to the EIR bucket 54 is a function of the EBS. These tokens are replenished at regular intervals.

Each queue is provisioned with CIR, CBS, EIR, EBS, subordinate QID, and CoS parameters. The CoS indicates the class of service of the queue and can range from 0 to 7. The subordinate QID identifies the queue to which unused CIR and EIR tokens should be passed. As long as there are still unused tokens available, the tokens are passed to the queues in the group as identified by the subordinate QID. FIG. 4 shows QoS groups 60-68, where groups 60-64 are each a group of one queue. A prioritized grouping of queues are therefore formed by using the subordinate QID. The use of subordinate QID enables the grouping of queues related by network port EVC or output LAN port to be scheduled subject to each other by using the same allocation of tokens according to CoS priority. A subordinate flag may be used to indicate whether a queue has a subordinate QID. Each group of queues also has associated therewith a group CIR token number, which is greater than or equal to the sum of CIR tokens allocated and replenished for all queues in the group. Further, the number of tokens allocated and replenished to each queue in response to the excess information rate is no greater than the number of tokens replenished for the group CIR token number.

Figure 5:
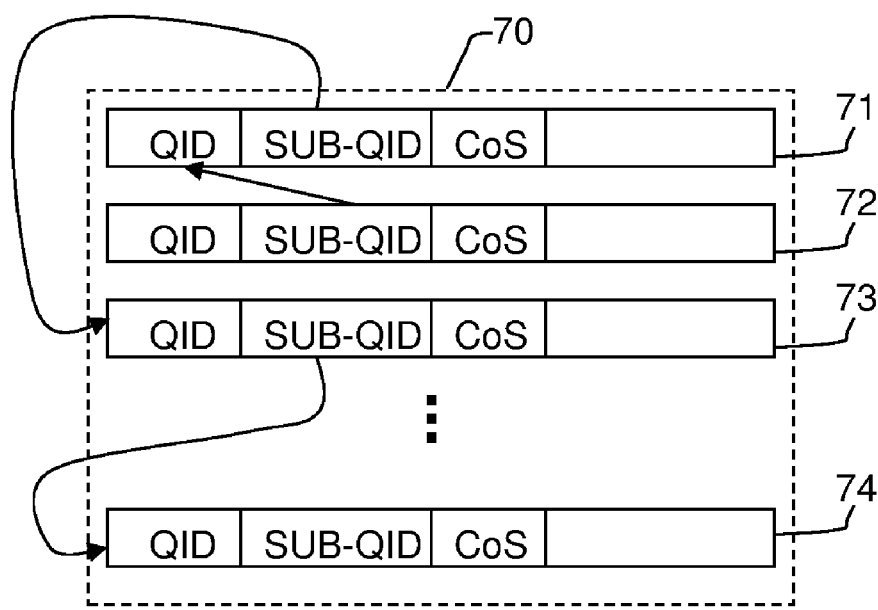
FIG. 5 is a simplified exemplary diagram of a group of queues linked by subordinate QID.

FIG. 5 is a simplified exemplary diagram of a queue grouping 70 linked by queue priority and the subordinate QID. The queues 71-74 in the group 70 are related by network port EVC or output LAN port. In the example shown in FIG. 5, queue 72 has the highest priority (CoS). The subordinate QID of queue 72 points or identifies queue 71 as the subordinate queue that should be allocated any left over CIR and EIR tokens not used to dequeue data from queue 72. The subordinate QID of queue 71, in turn identifies queue 73 as its subordinate queue that should receive an allocation of unused tokens from queue 71. Queue 74 is the subordinate queue of queue 73, as indicated by the subordinate QID of queue 73. The queues 71-74 are therefore linked by the subordinate QID in descending priority and the group of queues are "scheduled" subject to one another. Therefore, these groups of queues related by network port EVC or output LAN port are scheduled subject to each other. The intra-group scheduling is performed as a result, in a work-conserving manner. The overall scheduling of the groups which are members of the output port may or may not be work conserving, depending upon the provisioning of the aggregate of the groups.

Figure 6:
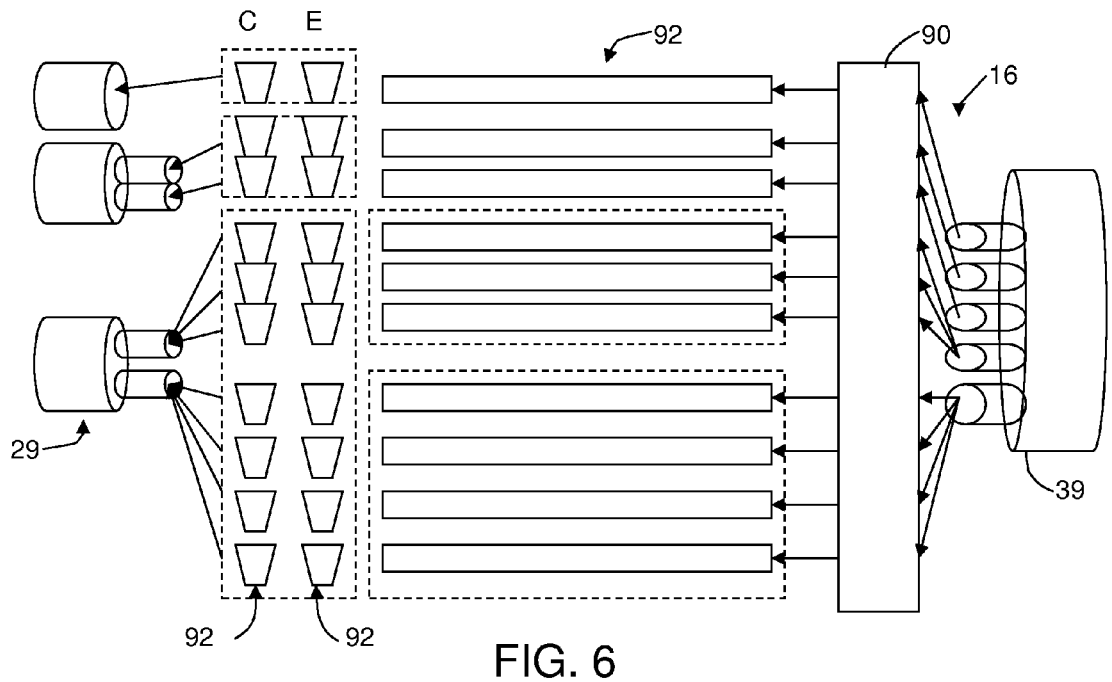
FIG. 6 is a more detailed block diagram of an embodiment of downstream (egress) aggregated shaping of multiple prioritized class of service flows.

FIG. 6 is a more detailed block diagram of an embodiment of downstream (egress) aggregated shaping of multiple prioritized classes of service flows. Downstream flow, i.e., from the network port 39 to the customer ports 29, is processed similarly to the upstream flow. The network EVCs 16 from the network port 39 are first processed by the classification, transformation, and policing modules, collectively shown as block 90. The classification module determines the classification of the flows from the network port 39. The transformation module operates on the VLAN tags, such as stripping the S and C tags from the frames. Data frames with invalid S and C tags are discarded. The policing module meters the frame flow based on specified CIR, CBS, EIR, and EBS service parameters. The data frames are then buffered and stored in egress queues 92 until they are dequeued and transmitted to the customer ports 29 according to the scheduling algorithm and available egress bandwidth. The data frames are dequeued by the scheduler using CIR and EIR buckets 94 and 96 in a similar manner as described above in conjunction with FIG. 4, and transmitted to the appropriate customer port 29.

The network equipment described herein is operable to control bandwidths offered to the carrier network from the network edge for multiple services, while offering different classes of service within each network service. The system and method described herein are applicable to any suitable network equipment coupled between two or more computer networks.

Although embodiments of the present disclosure have been described in detail, those skilled in the art should understand that they may make various changes, substitutions and alterations herein without departing from the spirit and scope of the present disclosure. Accordingly, all such changes, substitutions and alterations are intended to be included within the scope of the present disclosure as defined in the following claims. In the claims, means-plus-function clauses are intended to cover the structures described herein as performing the recited function and not only structural equivalents, but also equivalent structures.

What is claimed is:

1. A system coupled between at least one input port and at least one output port, comprising:
   at least one queue, each queue identified by a QID representing a priority based service within an aggregated service group such that all data within the at least one queue is associated with the priority based service and a class of service value, the at least one queue operable to receive and buffer data in at least one service flow from the at least one input port; and
   a predetermined at least one token allocated to each queue and a predetermined at least one aggregated services group token allocated to the aggregated service group such that the combination of the at least one token and the at least one aggregated services group token determine whether a predetermined amount of data may be dequeued from a queue and transmitted to the at least one output port; and
   at least one group of the at least one queue forming the aggregated services group where each queue in the group having a subordinate QID identifying a subordinate queue in the group having a lower priority for reallocating unused tokens, and where the subordinate QID for each queue in the group is determined based on the queue's class of service value; and
   the at least one output port receiving a plurality of output flows comprising the dequeued data from the at least one queue.

2. The system of claim 1, wherein the at least one group of queues having subordinate QIDs form a prioritized QoS queue.

3. The system of claim 1, wherein a maximum number of tokens allocated to each queue is related to a committed burst size of the queue.

4. The system of claim 3, further comprising a second predetermined at least one token allocated to each queue, where a maximum number of the second predetermined at least one token allocated to each queue is related to an excess burst size of the queue.

5. The system of claim 1, wherein the data in the queues in a group of queues are destined for a virtual connection of a carrier network at the at least one output port.

6. The system of claim 1, wherein data in the at least one group of queues are destined for at least one Ethernet virtual circuit of a carrier network at the at least one output port.

7. The system of claim 1, wherein the data in the queues in a group of queues are destined for a local area network at the at least one output port.

8. The system of claim 1, wherein the at least one token is replenished to each queue at regular intervals in response to a committed information rate.

9. The system of claim 8, wherein a number of the at least one aggregated services group token are replenished for each group of the at least one queue being greater than or equal to a sum of the at least one token replenished for all queues which are members of the group.

10. The system of claim 4, wherein the at least one token is replenished to each queue at regular intervals in response to an excess information rate.

11. The system of claim 10, wherein a number of the at least one token are replenished to each queue at regular intervals in response to the excess information rate is no greater than the number of the at least one aggregated services group token replenished for each group of the at least one queue in response to the committed information rate.

12. A system coupled between at least one first network port and at least one second network port, comprising:
   a buffer module comprising at least one queue, each queue identified by a QID representing a priority based service within an aggregated service group such that all data within the at least one queue is associated with the priority based service and a class of service value, the queue operable to receive and buffer data in at least one service flow from the at least one first network port, the at least one queue further divided into groups of queues forming the aggregated services group, the groups of queues linked by descending priority and a subordinate QID and the subordinate QID for each queue in each group is determined based on the queue's class of service value;
   at least one scheduler module each assigned to a queue, each scheduler module comprising:
      logic determining the allocation of a predetermined at least one token to each queue and a predetermined at least one aggregated services group token allocated to the aggregated service group such that the combination of the at least one token and the at least one aggregated services group token determine whether a predetermined amount of data may be dequeued from a queue and transmitted to a network via the at least one second network port; and
      logic reallocating unused tokens to subordinate queues in the group of queues; and
   the at least one second network port receiving a plurality of output flows from the at least one queue comprising the dequeued data from the at least one queue.

13. The system of claim 12, wherein the group of queues having subordinate QIDs form a QoS queue prioritized by the class of service assigned to each queue.

14. The system of claim 12, wherein a maximum number of the at least one token is allocated to a queue is related to a committed burst size of the queue.

15. The system of claim 14, further comprising a second predetermined at least one token allocated to each queue, where a maximum number of the second predetermined at least one token allocated to a queue is related to an excess burst size of the queue.

16. The system of claim 12, wherein the data in the queues in a group of queues are destined for a virtual connection in a network at the at least one network port.

17. The system of claim 12, wherein service flows are received from a carrier network via the at least one second network port, and the data in the queues in a group of queues are destined for a local area network at the at least one first network port.

18. The system of claim 12, wherein the at least one token is replenished to each queue at regular intervals in response to a committed information rate.

19. The system of claim 18, wherein a number of the at least one aggregated services group token are replenished for each group of the at least one queue being greater than or equal to a sum of the at least one token replenished for all queues which are members of the group.

20. The system of claim 15, wherein the at least one token is replenished to each queue at regular intervals in response to an excess information rate.

21. The system of claim 20, wherein a number of the at least one token are replenished to each queue at regular intervals in response to the excess information rate is no greater than the number of the at least one aggregated services group token replenished for each group of the at least one queue in response to a committed information rate.

22. A method of aggregated shaping of at least one service flow, comprising:
   receiving data in at least one service flow from at least one input port;
   classifying the received data as data for one of at least one class of service flows;
   storing the data of at least one class of service flow in at least one queue representing a priority based service within an aggregated service group such that all data within the at least one queue is associated with the priority based service, each queue having a class of service designation;
   allocating a predetermined number of tokens to each queue and a predetermined number of group tokens to a group of queues that form the aggregated services group, the predetermined number of tokens to each queue and the predetermined number of group tokens to the group of queues determines whether a predetermined amount of data may be dequeued from the queues in the group in order of the class of service designation and transmitted to at least one output port; and
   outputting at least one output flow comprising the dequeued data from at least one queue.

23. The method of claim 22, comprising forming at least one group of prioritized queues that forms the aggregated services group, the queues in each group being linked by a subordinate QID assigned to the queues and unused tokens of a queue in a group are passed to a lower priority queue identified by the subordinate QID.

24. The method of claim 22, wherein allocating the predetermined number of tokens to each queue comprises allocating a maximum number of tokens to each queue corresponding to a committed burst size of the queue.

25. The method of claim 22, further comprising allocating a second predetermined plurality of tokens to each queue, where a maximum number of the second predetermined plurality of tokens allocated to each queue corresponds to an excess burst size of the queue.

26. The method of claim 22, wherein receiving data comprises receiving data frames from a plurality of virtual local area networks via a plurality of customer ports, and outputting data frames to a plurality of Ethernet virtual circuits in a carrier network via at least one network port.

27. The method of claim 22, wherein receiving data comprises receiving data frames from a plurality of Ethernet virtual circuits in a carrier network via a network port, and outputting data frames to a plurality of virtual local area networks via a plurality of customer ports.

28. The method of claim 22, further comprising replenishing tokens to each queue at regular intervals in response to a committed information rate.

29. The method of claim 28, wherein replenishing tokens comprises replenishing a number of group tokens for the group of queues that form the aggregated services group being greater than or equal to a sum of tokens replenished for all queues which are members of the group.

30. The method of claim 25, further comprising replenishing tokens to each queue at regular intervals in response to an excess information rate.

31. The method of claim 30, wherein replenishing tokens comprises replenishing a number of tokens to each queue at regular intervals in response to the excess information rate is no greater than the number of group tokens replenished for each group of the at least one queue in response to a committed information rate.

* * * * *